(12) United States Patent  (10) Patent No.: US 8,989,017 B2
Naouri et al.  (45) Date of Patent: Mar. 24, 2015

(54) NETWORK CONGESTION MANAGEMENT BY PACKET CIRCULATION

(71) Applicant: Intel Corporation, Santa Clara, CA (US)

(72) Inventors: Ygdal Naouri, Jerusalem (IL); Radia Perlman, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 97 days.

(21) Appl. No.: 13/715,669

(22) Filed: Dec. 14, 2012

(65) Prior Publication Data

US 2014/0169173 A1    Jun. 19, 2014

(51) Int. Cl.
*H04L 29/06*    (2006.01)
*H04L 12/26*    (2006.01)
*H04L 12/803*   (2013.01)
*H04L 12/801*   (2013.01)
*H04L 12/931*   (2013.01)

(52) U.S. Cl.
CPC .............. *H04L 47/122* (2013.01); *H04L 47/10* (2013.01); *H04L 49/50* (2013.01)
USPC ............................ 370/237; 370/392; 370/410

(58) Field of Classification Search
CPC .................. H04L 47/00–47/10; H04L 47/122; H04L 47/15; H04L 47/125; H04L 49/50
USPC ........... 370/230–468; 709/201–207, 213, 219
See application file for complete search history.

(56) References Cited

U.S. PATENT DOCUMENTS 6,775,280 B1 *   8/2004  Ma et al. ...................... 370/392
7,672,243 B2 *   3/2010  Mayhew ...................... 370/236
8,144,708 B1    3/2012  Ahmed et al.
8,635,284 B1 *   1/2014  Tripathi et al. ............... 709/206
2003/0002503 A1 *   1/2003  Brewer et al. ................. 370/392
2007/0104096 A1 *   5/2007  Ribera .......................... 370/229
2007/0140114 A1 *   6/2007  Mosko .......................... 370/229
2007/0140240 A1 *   6/2007  Dally et al. .................... 370/389
2010/0177637 A1    7/2010  Kadambi et al.
2012/0224475 A1    9/2012  Taylor et al.
2012/0297083 A1    11/2012  Ferguson et al.

FOREIGN PATENT DOCUMENTS

KR    10-2004-0009225 A    1/2004

OTHER PUBLICATIONS

International Search Report on Patentability and Written Opinion received for PCT Patent Application PCT/US2013/046691, mailed Sep. 27, 2013, 10 pages.

* cited by examiner

*Primary Examiner* — Afsar M Qureshi
(74) *Attorney, Agent, or Firm* — Law Office of R. Alan Burnett, PS

(57) ABSTRACT

Methods, apparatus, and networks configured to manage network congestion using packet recirculation. The networks employ network elements (e.g., Rbridges in Layer 2 networks and switches/routers in Layer 3 networks) that are configured to support multi-path forwarding under which packets addressed to the same destination may be routed via multiple paths to the destination. In response to network congestion conditions, such as lack of availability of a non-congested port via which a shortest path to the destination may be accessed, a packet may be routed backward toward a source node or forwarded toward a destination along a non-shortest path. The network elements may employ loopback buffers for looping packets back toward a source via the same link the packet is received on.

30 Claims, 13 Drawing Sheets

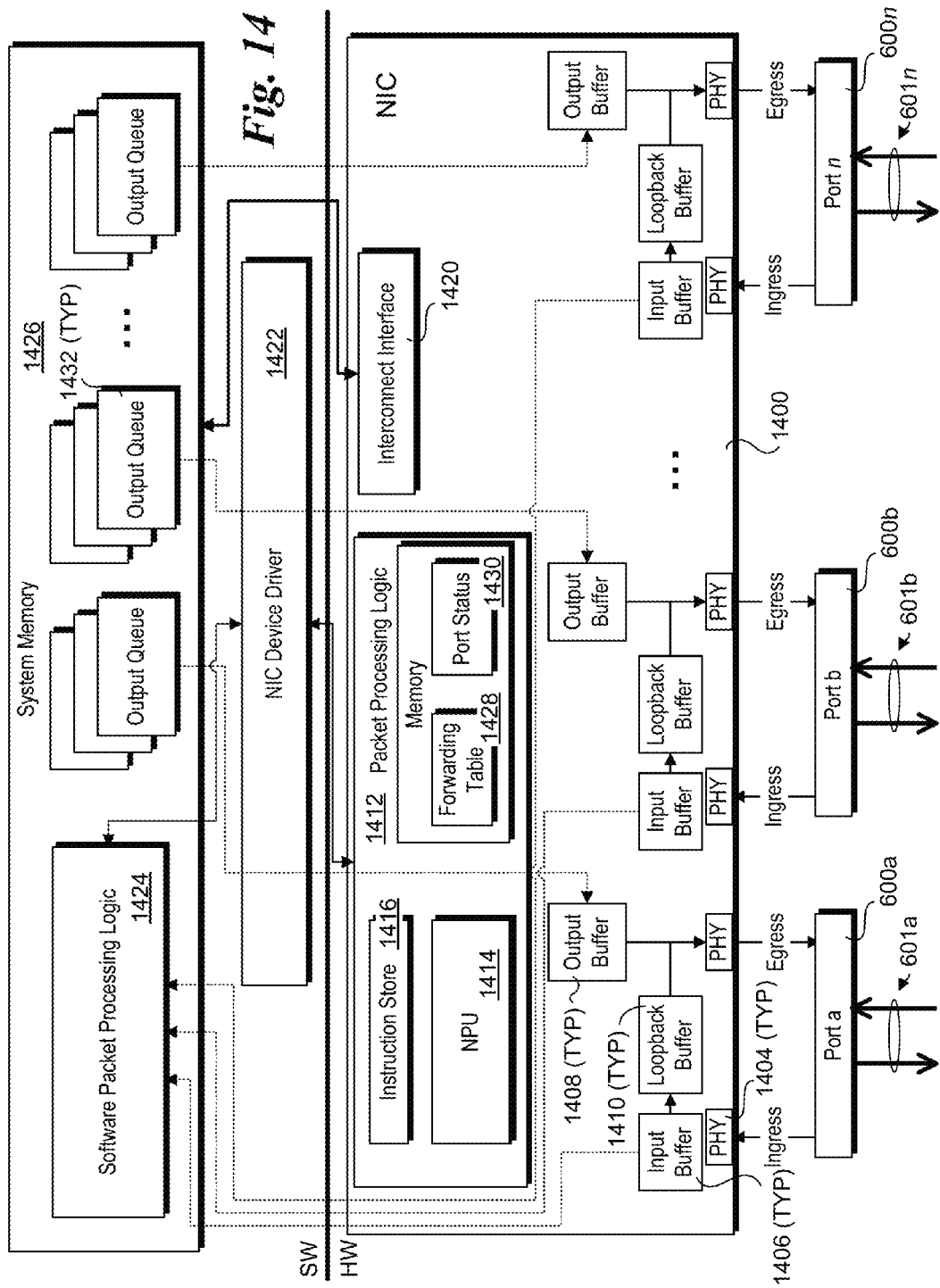

NETWORK CONGESTION MANAGEMENT BY PACKET CIRCULATION

FIELD OF THE INVENTION

The field of invention relates generally to computer networks and, more specifically but not exclusively relates to techniques for reducing network congestion via packet circulation.

BACKGROUND INFORMATION

Computer networks are ubiquitous to today's computer usage. Increases in processor speeds, memory, storage, and network bandwidth technologies have resulted in the build-out and deployment of networks with ever increasing capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, and addition to the deployment of massive data centers to support these services which employ private network infrastructure. Additionally, the new generation (i.e., 4G) of mobile network data services is expected to significantly impact the utilization of both wireless and land-line networks in the near future. The result of these and other considerations is that the utilization of computer networks is expected to continue to grow at a high rate for the foreseeable future.

The key components for facilitating packet forwarding in a computer network are the switching elements, which are generally referred to herein as network elements and include switches, routers and bridges. A switch has multiple input and output ports, each connected via a link to another switch or other type of network element, wherein inbound packet traffic is received at the input ports and forwarded out of the output ports. Generally, the number of physical input and output ports is equal, and the amount of traffic received at or forwarded out of a given port relative to the other ports is variable. Internally, the input and output ports of a switch are logically connected such that each input port is connected to each output port in a one-to-many configuration. Each of the input and output ports have buffers for temporarily storing (i.e., buffering) packets, and the switch has other intermediate output buffers and/or queues typically associated with different flow classes, Quality of Service (QoS) levels, etc. Under a typical configuration packets received at a given input port are initially buffered in an input buffer associated with the input port and classified. Once classified, the packet may be buffered along with other packets classified to the same class or flow in an intermediate output buffer allocated to the class or flow and/or associated with an output port via which the packet is to be forwarded. The packet may then be copied from the intermediate buffer to a smaller output buffer for the port or otherwise the packet data in the intermediate output buffer may be forwarded to the Physical (PHY) layer interface of the port and converted to an electrical analog, optical, or wireless signal for transmission over the link.

Even as networks get faster, congestion continues to exist. On some levels, network congestion is analogous to vehicle traffic congestion on freeways. For example, consider multiple onramps to a section of freeway. The incoming traffic comes from multiple paths and is merged into a single traffic flow. Similarly, packets may be received by a network element at multiple input ports, yet be forwarded via a single output port. The multiple input ports are analogous to the onramps and the merged traffic flow is analogous to the traffic flow forwarded via the output port.

Traffic management on freeways is often handled by metering the flow of traffic entering via the onramps. Under this approach, stop and go light signaling is used to control the rate of traffic entering the merged flow. Like freeways, network switches have limited throughput. However, unlike freeways, where the traffic is simply slowed when congested and all vehicles are allowed to proceed, switches operate at line-speeds that are a function of the underlying physical (layer) transport, such as 1, 10 or 40 Gigabytes per second (Gbps). The way fluctuation in traffic loads is handled is by buffering the (to be merged via an output port) traffic in the output and intermediate buffers. However, these buffers are limited in size, and measures must be taken to prevent buffer overfill.

When an output buffer approaches it capacity, the switch generally takes one or more of the following actions. First, it may drop incoming packets. It may also issue flow control notifications to its peer switches, and/or send backward congestion notifications to the congesting source nodes so that it reduces the throughput of the congested flow(s). Oftentimes, these actions are either not efficient or generate undesirable side effects.

In reliable transport protocols like TCP (Transaction Control Protocol), packets drop involves retransmission of the dropped packets, which increases end-to-end latency of the whole data transfer, especially if the packet drop is detected by some timer expiration at the destination end nodes. Also, dropped packets may result in reduction of the TCP window size, which reduces the throughput even if the congestion was just transient. Meanwhile, flow control may lead to congestion spreading backward in the network. All incoming traffic to the congested switch may rapidly be stopped because flow control notifications issued to the peers are generic XOFF/XON requests, which do not differentiate between traffic flows that are destined to the congested output buffer and those that are not. Later on, if the congested situation persists at the hot spot, the peer nodes themselves get congested as they cannot sink traffic that was destined to the congested switch; and so forth throughout the whole network.

Sending backward congestion notifications to the congesting sources (like the QCN (Quantized Congestion Notification) protocol does) defines a network-wide control loop that may not be efficient in case the congestions are just transient conditions and/or in case the congesting flows are not long-lived enough with regard to the round trip delay between the hot spot and the source nodes. Note that for transport protocols which unlike TCP will start flow transmission at the full link speed without handling any congestion window (e.g., FCoE (Fibre Channel over Ethernet) transport), the flow duration is generally too small with regard to the round trip delays, and therefore there is not enough time for backward congestion management loops to be established. This is especially true when link speeds are 1 Gbps and beyond. On the other hand, when the transport protocol implements a slow start mechanism like TCP does, end-to-end data transfer delays are unnecessarily extended a priori until the congestion window algorithm stabilizes the flow transmission rate around the network capacity.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1a is a schematic diagram illustrating logical link connections between Rbriges in the TRILL network of FIG. 1a;

FIG. 1b shows the logical link connections of FIG. 1b overlaid over the network segments of the TRILL network shown in FIG. 1a;

FIG. 3 is a schematic diagram illustrating an example of multi-path routing using the logical TRILL network link and node topology shown in FIG. 1a;

FIG. 3a is a schematic diagram illustrating multi-path routing between an RBridge and a destination node using the logical TRILL network link and node topology shown in FIG. 1a;

FIG. 14 is block schematic diagram of a Network Interface Controller (NIC) configured to implement packet recirculation in accordance with aspects of the embodiments disclosed herein.

DETAILED DESCRIPTION

Figure 1:
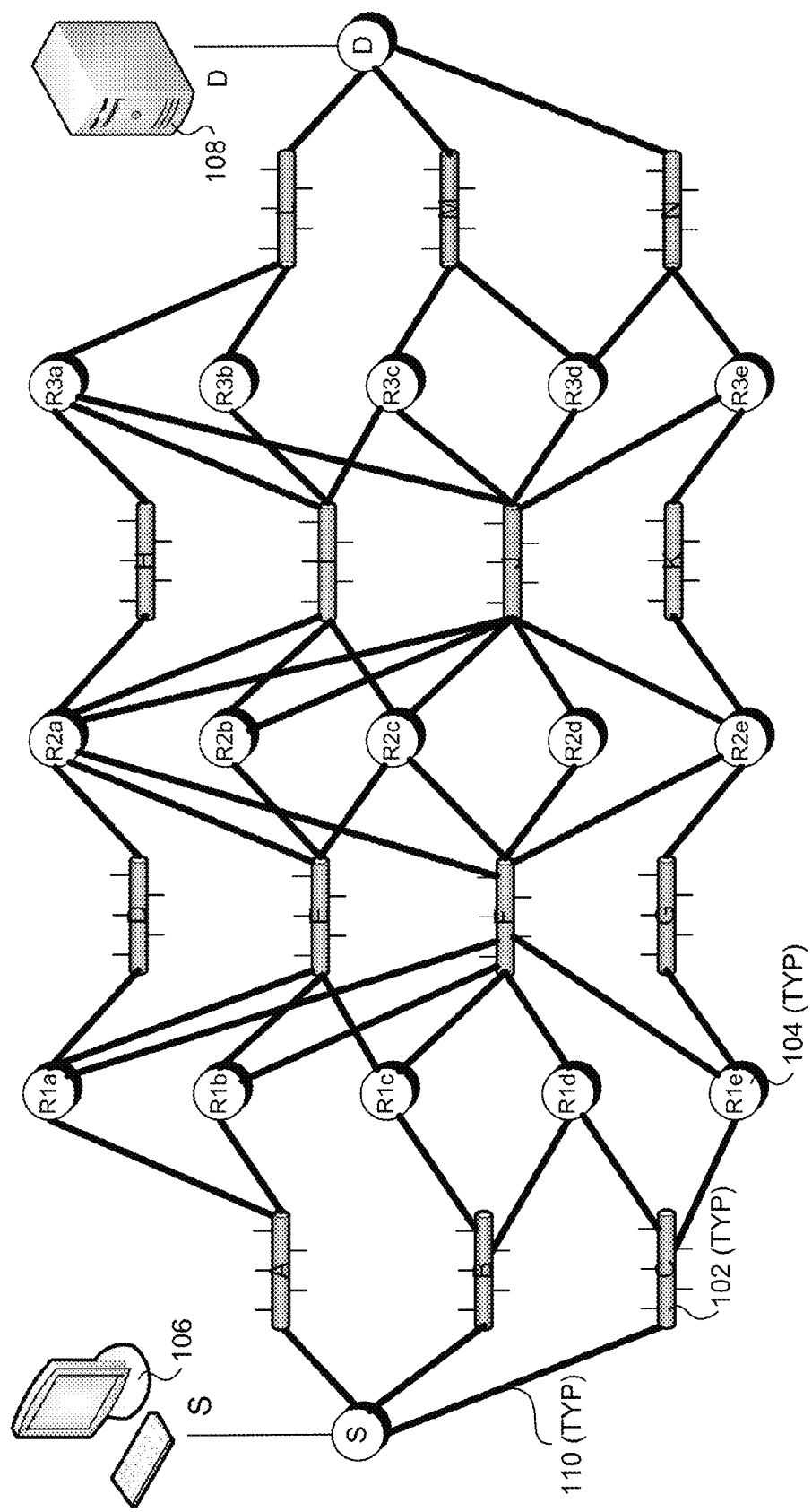
FIG. 1 is a schematic diagram of a portion of an exemplary TRILL network.

Embodiments of methods, apparatus, and networks configured to manage network congestion using packet recirculation are disclosed herein. In the following description, numerous specific details are set forth (such as embodiments implemented in TRILL networks) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments now disclosed, enhancement to network management and throughput is achieved through use of packet (re)circulation in networks employing network elements that support multi-path forwarding. Under this approach, whenever a unicast packet that belongs to a reliable transport protocol (such as TCP) is destined to a congested output port, instead of dropping the packet, the packet is recirculated to another output port that is currently not congested in hope of finding out from there a non-congested path to the destination.

Generally, the teaching and principles disclosed via the embodiments herein may be implemented under various types of networks employing various types of protocols. In some embodiment techniques may be implemented in a network "cloud" under the following assumptions. First, the network cloud is provisioned with multi-pathing so that traffic can be load-balanced across multiple paths that may exist between source and the destination nodes. In some network architectures, such as TRILL (Transparent Interconnection of Lots of Links) networks, traffic can be load-balanced across multiple shortest parallel paths that may exist between the source and the destination nodes. Alternatively, at least, packets can be forwarded to another route rather than the shortest path to destination without confusing the forwarding/routing tables in the network elements. Second, packets transported over a reliable transport protocol can arrive at the destination nodes out of order, without involving significant extra processing latency for delivering them to the application layer. Under some embodiments, this may not apply to all packets, but only to packets that are marked to support reordering. Third, congesting conditions are generally not long-lived enough relative to the round trip time from the hot spot (e.g., congested port) back to the source node in order to permit efficient network-wide congestion management control loops (e.g., the control loop defined by the QCN protocol).

In accordance with one aspect of the embodiments, the general concept is to take advantage of the buffering capacity distributed throughout the network elements for temporarily storing packets until a transient congested condition disappears and a free path is found to the destination. If the congestion persists, packets will typically be looped back up to the congesting source port, which, in return will reduce the transmission rate for the concerned flow. In a manner similar to that employed for QCN, transmit rate decrease (as well as self-increase) algorithms may be run at the source node whenever a new packet is looped back to its source.

An example of a network cloud architecture that supports multipath forwarding is a TRILL network. As the acronym suggest, a TRILL network employs a transparent interconnection with many links. Moreover, the network elements in TRILL networks, referred to as Routing Bridges (RBridges) or TRILL switches, are configured to support multi-path forwarding using parallel paths. To facilitate the use of reliable transport protocols in TRILL networks, packets may be received out-of-order. By comparison, conventional switches in IP networks (or portions thereof in large networks such as the Internet) are configured to forward packets classified to the same flow along a single path so that packets are received in the order they are transmitted. The aspects of multi-path forwarding and out-of-order packet reception are fundamental to forwarding packets in TRILL networks.

Figure 1A:
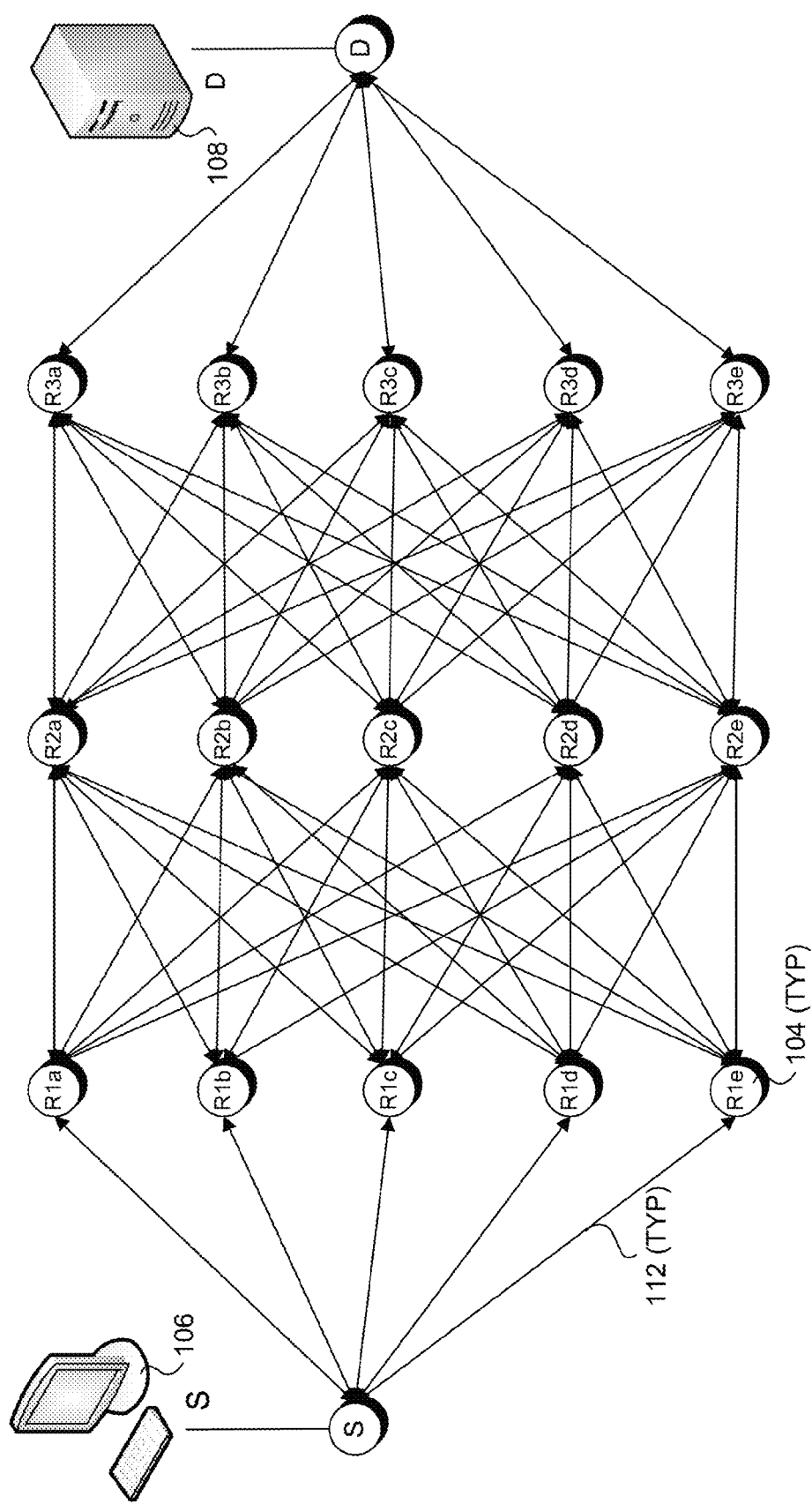
Figure 1B:
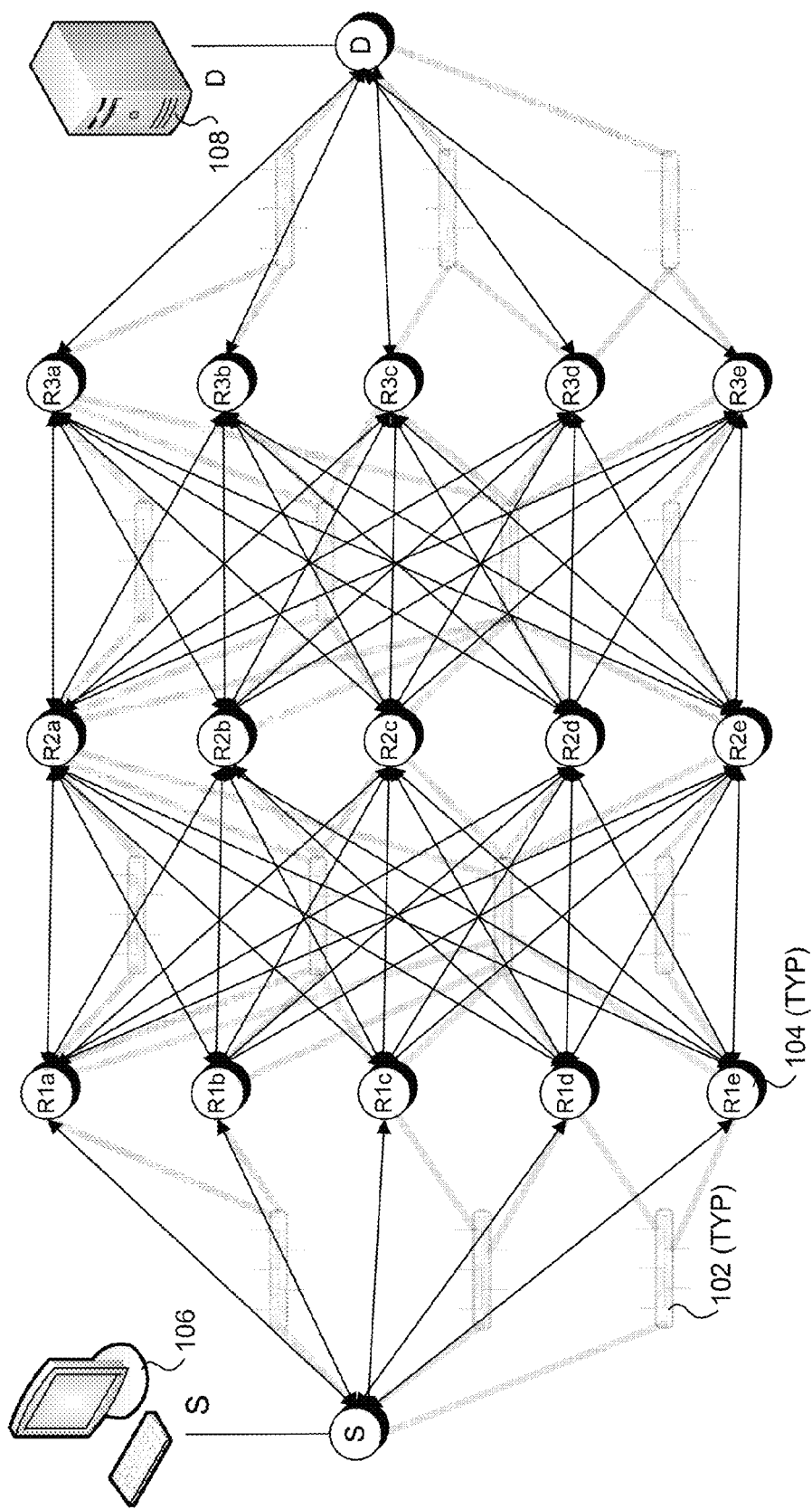

An exemplary TRILL network 100 is shown in FIGS. 1, 1a, and 1b. Network 100 includes a plurality of Ethernet segments 102 (labeled A-N) that are interconnected via a plurality of RBridges 104 (each with a respective label as shown). Also depicted are a source computer 106 coupled to the network at source node S and a destination computer 108 coupled to the network at a destination node D. The network configuration illustrated in FIG. 1 is also referred to as an RBridge Campus.

TRILL an Internet Engineering Task Force (IETF) protocol standard that uses Layer 3 (i.e., the OSI model Network Layer) routing techniques to create a large cloud of links that appear to IP nodes to be a single IP subnet. It allows a fairly large Layer 2 (i.e., the OSI model Data Link Layer) cloud to be created, with a flat address space, so that nodes can move within the cloud without changing their IP addresses, while using various Layer 3 routing techniques that have evolved over the years, including shortest paths and multi-pathing. Additionally, TRILL supports Layer 2 features such as Virtual Local-Area Networks (VLANs), the ability to autoconfigure (while allowing manual configuration if so desired), and multicast/broadcast with no additional protocol.

The TRILL protocol evolved to address some limitations inherent to Layer 2 networks. To better understand these limitations, a review of the history of Layer 2 is insightful. Originally, Layer 2 operated as a direct link between neighbor nodes. Most links were point-to-point, and Layer 2 protocols primarily created framing—a way to signal the beginning and end of packets within the bit stream provided by Layer 1 (the Physical Layer) and checksums on packets. For links with high error rates, Layer 2 protocols such as High-Level Data Link Control (HDLC) provided message numbering, acknowledgements, and retransmissions, so the Layer 2 protocol resembled, in some ways, a reliable protocol such as TCP. HDLC and other Layer 2 technologies sometimes provided an ability to have multiple nodes share a link in a master/slave manner, with one node controlling which node transmits through techniques such as polling.

Then the concept of Local Area Networks (LANs) evolved, the most notable example being Ethernet. Ethernet technology enabled interconnection of (typically) hundreds of nodes on a single link in a peer-to-peer rather than master/slave relationship. Ethernet was based on CSMA/CD, where CS=Carrier Sense (listen before talking so you don't interrupt); MA=Multiple Access; and CD=Collision Detect (listen while you are talking to see if someone starts talking while you are so you are both interfering with each other).

While Ethernet LANs are widely deployed today, forwarding and routing packets over such LANs are typically implemented using Layer 3 Routers and Switches. However, this wasn't the case historically; rather, when Ethernet LANs came onto the scene early adopters believed that LAN technology could be used as a replacement of traditional Layer 3 protocols such as IP. People built applications that were implemented directly on Layer 2 and had no Layer 3 support. This situation meant that the application would be limited by the artifacts of the Layer 2 technology, because a Layer 3 router cannot forward packets that do not contain the Layer 3 header implemented by the router/switch. In addition, the span of an Ethernet LAN was limited to a maximum distance of perhaps a kilometer.

When people using technologies built directly on a LAN realized they wanted networks larger (in distance and total number of nodes) than the LAN technology allowed, the industry invented the concept of "bridges"—packet-forwarding devices that forwarded Layer 2 packets. Forwarding Ethernet packets might seem easy because the Ethernet header looks similar to a Layer 3 header. It has a source and destination address, and the addresses are actually larger than IP addresses. But Ethernet was not designed to be forwarded. Most notably absent from the Ethernet header is a hop count (also sometimes referred to as a "time to live," or TTL) to detect and discard looping packets. But other features of a typical Layer 3 protocol were also missing in Ethernet, such as an address that reflects where a node is in the topology, node discovery protocols, and routing algorithms. These features were not in Ethernet because the intention of the Ethernet design was that it be a Layer 2 protocol, confined to operation on a single link.

To address this shortcoming, the transparent bridge was invented as a mechanism to forward Ethernet packets emitted by end nodes that did not implement Layer 3. Ethernet at the time had a hard packet size limit, so bridges could not modify the packet in any way. The transparent bridge design, which met those constraints, consisted of having bridges listen promiscuously, remember the source addresses seen on each port, and forward based on the learned location of the destination address. If the destination was unknown, the packet would be forwarded onto all ports except the one that it was received on.

This simple method worked only if there was only one path between any pair of nodes. So the concept was enhanced with a protocol known as the spanning tree algorithm. The physical topology could be an arbitrary mesh, but bridges, using the spanning-tree algorithm, would prune the topology into a loop-free (tree) topology on which data packets were forwarded. ("Spanning" means that packets can reach all the nodes.) While this approach solved aspects of the problem of forwarding Ethernet packets between LANs, it proved to be impractical for today's networks. It requires bridges to be engineered to be able to examine every incoming packet at wire speed, to determine if the packet is a spanning-tree message, and if so, process it. The spanning-tree algorithm requires a bridge to forward unless there is a "more qualified" neighbor bridge on the link. If a bridge loses enough spanning-tree messages from its "more qualified" neighbor bridge because congestion overwhelms its ability to process incoming messages, the bridge will conclude that it does not have a more qualified neighbor, and therefore should start forwarding onto the link. This and other situations make the approach inherently unstable.

The originally invented Ethernet, CSMA/CD, is pretty much non-existent. Almost all Ethernet today consists of bridges connected with point-to-point links. The header still looks like Ethernet, but new fields have been added, such as VLANs. Bridging was necessitated by a quirk of history, in that applications were being built without Layer 3. But today, applications are almost universally built on top of IP. So why not replace all bridges with IP routers?

The reason is an idiosyncrasy of IP. In IP, routing is directed to a link, not a node. Each link has its own block of addresses. A node connected to multiple links will have multiple IP addresses, and if the node moves from one link to another, it must acquire a new IP address within the block for that link. With IP, a block of IP addresses needs to be carved up to assign a unique block to each link, IP routers need to be configured with the address block for each of their ports, and nodes that move from one link to another have to change their Layer 3 addresses. Therefore, it is still popular to create large bridged Ethernets, because a bridged set of links looks to IP like a single link.

TRILL allows the ease of configuration of Ethernet while benefitting from the routing techniques provided at Layer 3. Since it also coexists with existing bridges, it is not necessary to replace all the bridges in an Ethernet, but the more bridges replaced by RBridges, the better the bandwidth usage and the more stable the cloud becomes (because the spanning trees get smaller and smaller, and ultimately disappear if all bridges are replaced by RBridges).

RBridges run a link state routing protocol, which gives each of them knowledge of the network topology consisting of all the RBridges and all the links between RBridges in the network. Using this protocol, each RBridge calculates shortest paths from itself to each other RBridge, as well as trees for delivering multi-destination traffic.

A link state protocol is a routing protocol in which each router R determines who its neighbors are, and broadcasts (to the other routers) a packet, known as a Link State Packet (LSP), that consists of information such as "I am R," and "My neighbor routers are X (with a link cost of c1), Y (cost c2), and Z (cost c3)." The commonly deployed link state protocols are Intermediate System-to-Intermediate System (IS-IS) and Open Shortest Path First (OSPF). IS-IS, designed in the 1980s to route DECnet, was adopted by the International Organization for Standardization (ISO). IS-IS can route IP traffic and is used by many Internet Service Providers (ISPs) to route IP. IS-IS was a natural choice for TRILL because its encoding easily allows additional fields, and IS-IS runs directly on Layer 2, so that it can autoconfigure, whereas OSPF runs on top of IP and requires all the routers to have IP addresses.

Figure 2:
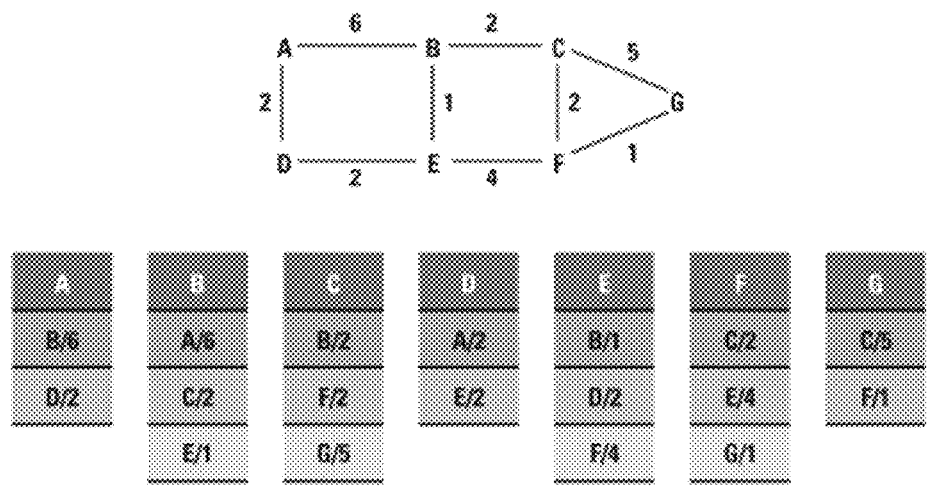
FIG. 2 is a two part diagram illustrating use of a link state protocol in a seven-node network and a corresponding link state database.

FIG. 2 shows a small network (at the top), consisting of 7 routers. In the bottom half of the figure, the LSP database is shown; all the routers have the same LSP database because they all receive and store the most recently generated LSP from each other router. The LSP database gives all the information necessary to compute paths. It also gives enough information for all the routers to calculate the same tree, without needing a separate spanning-tree algorithm.

Returning to FIGS. 1, 1a, and 1b, FIG. 1a depicts the logical link configuration between RBridges 104 in the portion of TRILL network 100 depicted. In FIG. 1a, the RBridge 104 are labeled based on the hop distance from source computer node S and groupings based on shared hop distances. For example, a first hop group of RBridges are respectively connected to source computer node S via a single logical link (and thus a single hop), and thus are labeled R1n, wherein the '1' represents the number of hops from source computer node S, while n identifies a corresponding RBridge a-e for the group member (e.g., R1a, R1b, etc.). Similarly, the RBridges that are two hops away from node S are labeled R2n, and the RBridges that are three hops from node S are labeled R3n.

In the exemplary network configuration depicted in FIGS. 1, 1a and 1b, each RBridge 104 in a given group is connected to each RBridge in an adjacent group. In addition, each of the RBridges in the first group are connected to source computer node S, while each of the Rbridges in the third group are connected to destination computer node D. This configuration supports full multi-path routing between each RBridge node, meaning a maximum number of parallel forwarding paths are available between any two nodes in the network. It is noted that this network configuration as used herein is illustrated to emphasize the availability of forwarding via multiple parallel paths, and that in an actual network implementation a given RBridge may only be connected to a portion of RBridges in a group of (hop-wise) adjacent RBridges.

Also, a group of RBridges at a given hop distance may have a different number of RBridges than the number of RBridges in an adjacent group. Moreover, the hop distances that are depicted are relative to a given source and destination node; in practice, many source and destination nodes will exist (based on the source and destinations endpoints for respective transmissions), where a given source or destination node may correspond to a network endpoint or one of the RBridge nodes. In addition, a network employing RBridges may include a mixture of RBridges and conventional Bridges in addition to network configuration that only employ RBridges (such as shown in FIGS. 1, 1a, and 1b).

Figure 3:
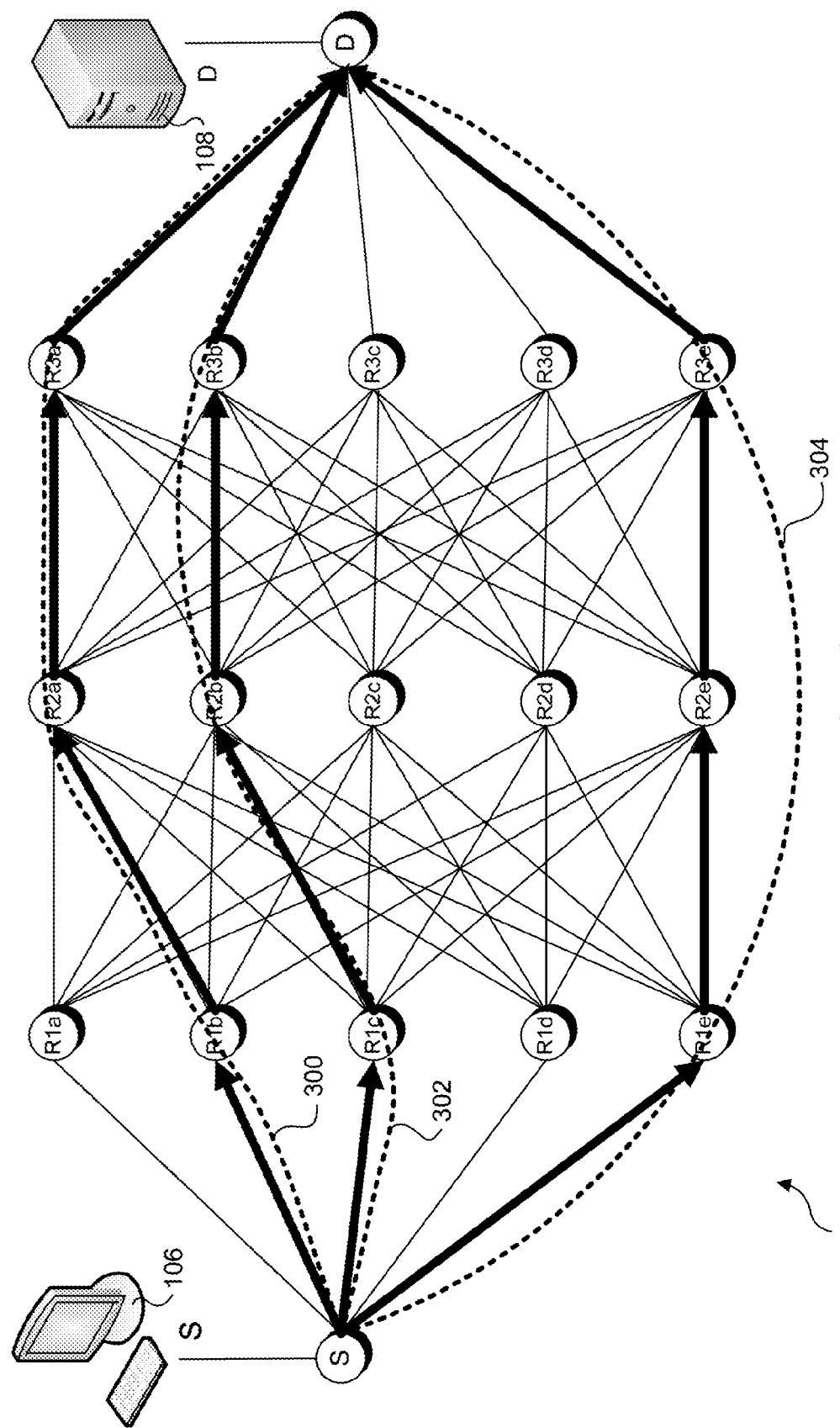
Figure 3A:
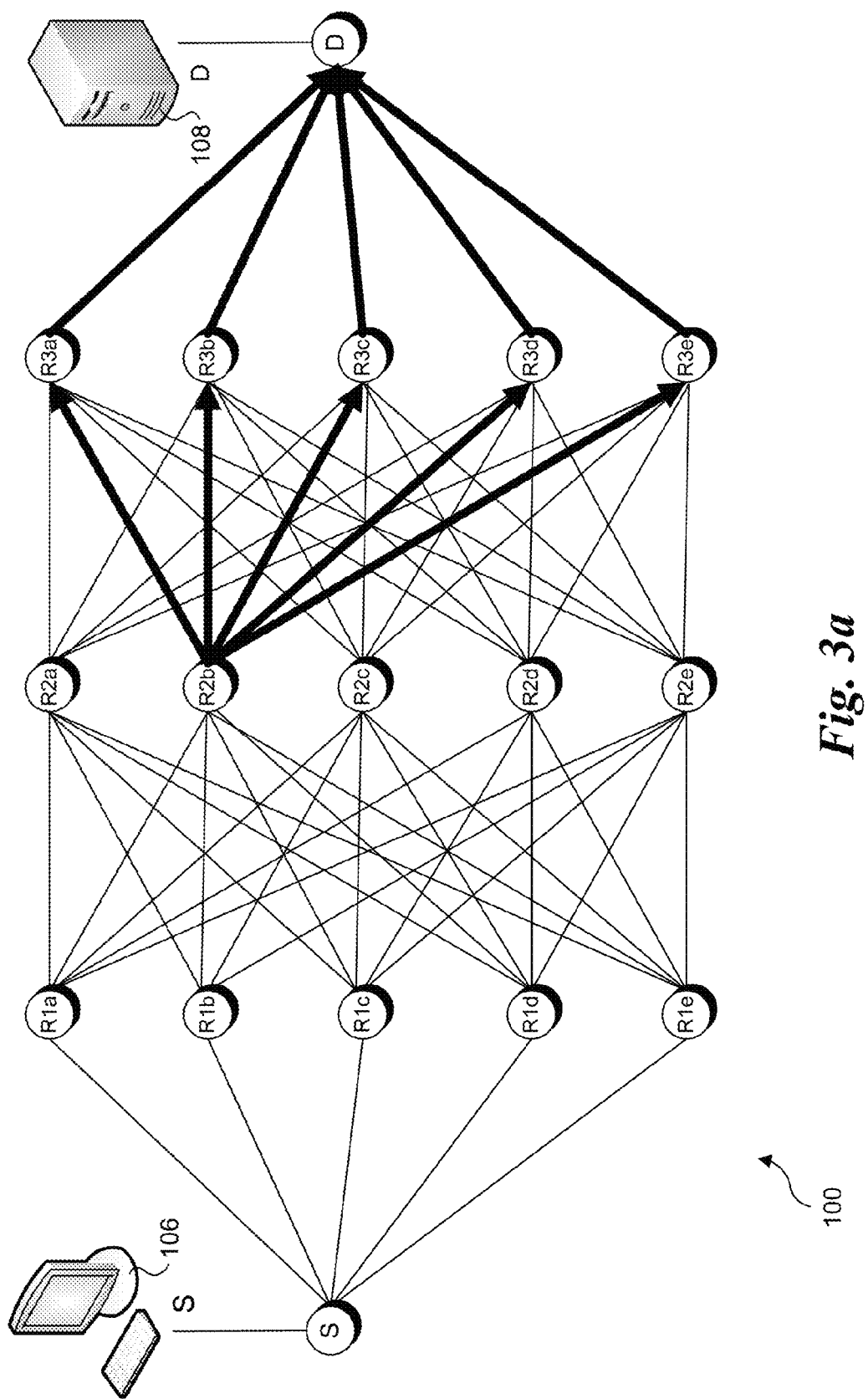

FIGS. 3 and 3a depict an example of the use of multi-path forwarding in TRILL network 100. As shown in FIG. 3, there are three parallel forwarding paths 300, 302, and 304 between the source and destination nodes S and D (in actuality, there are many more parallel forwarding paths; only three are highlighted here for simplicity). As further detailed in FIG. 3a, there are potentially 5 parallel sub-paths between RBridge R2b and destination node D alone. Extending this to the possible parallel forwarding paths between source and destination nodes S and D yields 125 unique parallel forwarding paths that are available. Of course, in an actual implementation the number of parallel forwarding paths for a 4-hop route between source and destination nodes will typically be less than this, but the point is there are a number of parallel forwarding paths that are available between endpoints in TRILL networks.

In order to support parallel forwarding paths, RBridges store corresponding forwarding table entries under which multiple output ports may be used for forwarding a packet to a given destination. The forwarding table data is derived from information gathered using the IS-IS link state protocol in the manner discussed above. This multi-path forwarding technique is converse from conventional IP routing, wherein a single forwarding path may be employed for all packets that are classified to the same flow. Such IP forwarding routes are typically determined using protocols such as OSPF.

Since packets that are logically associated with the same flow (i.e., having the same source and destination and associated with the same logical connection) may be forwarded along different routes, destinations need to include provisions for receiving packets out of order. Although depicted as parallel forwarding paths having similar path segment lengths, the effective length of a given path segment between RBridges will be generally be a function of traffic congestion at the RBridges, and thus the latency for traversing a single path segment may vary quite a bit. Moreover, the multi-path forwarding capability of RBridges means packets may be forwarded via paths that having a different number of hops, thus enhancing the routing flexibility of the network.

Figure 4:
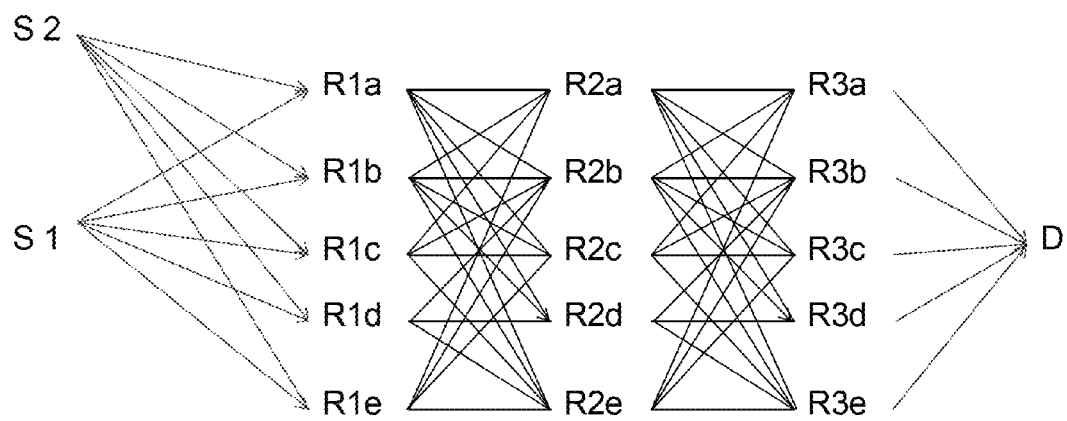
FIG. 4 is a diagram illustrating a congestion condition that may occur when two sources are concurrently sending traffic to one destination.

Even though TRILL networks support multi-path forwarding and out-of-order delivery, they are still subject to traffic congestion that leads to dropped packets. For example, consider the network configuration shown in FIG. 4. If both sources S1 and S2 attempt to forward packets to destination D at wire speed, there will be congestion, resulting in packets being dropped. When concurrent transmissions between arbitrary sources and destinations are supported, the occurrence of congestion resulting in dropped packets is exacerbated.

In accordance with the principles and teachings of the embodiments herein, the logic and port configuration in the RBridges are modified to support re-circulation of packets rather than dropping packets. As explained in further detail below, when an output port corresponding to a (normally preferred) forwarding path is congested (and thus not available), another output port is selected based on various factors.

If none of the forwarding path ports are available, a packet may be routed "backward" to an RBridge (or conventional bridge) that is further away (in term of hop-count and/or estimated route cost) from the destination node than the RBridge that initiates the backward route. Upon receipt by the RBridge (or conventional bridge), the packet is forwarded back toward the destination (as applicable, depending on available forwarding ports). Under applicable conditions, a packet may be routed backwards more than once before it is forwarded toward its original destination.

Figure 5:
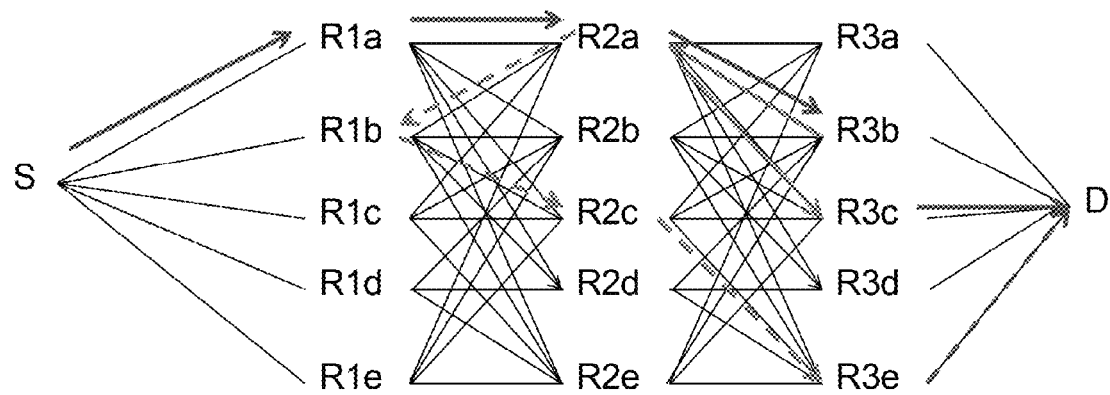
FIG. 5 is a diagram illustrating an example of packet recirculation under which the forwarding path to the destination node employs a backward path portion toward the source node.

Two examples of packet recirculation involving backward routing are shown in FIG. 5. In both examples, a packet originates at source node S and is destined for destination node D. In the first example, the packet is forwarded from node S to RBridge R1*a* and then to RBridge R2*a*. At RBridge R2*a*, each of the ports that are attached to links that would forward the packet to one of Rbridges R3*a-e* is congested. In response to this congested condition, the packet is routed backward to RBridge R1*b*, which then forwards the packet along the path R1*b*→R2*c*→R3*e*→D, as depicted by corresponding dashed-line path segments. In the second example, a similar congestion condition is present at RBridge R3*b*. In this case, the packet is routed backward along the same path segment via which the packet was received by RBridge R3*b* to RBridge R2*a* (i.e., R3*b*→R2*a*). This is referred to herein as the packet being "looped back," and discussed in further detail below. Upon receiving the packet at RBridge 2*a* it is forwarded along route R2*a*→R3*c*→D to destination node D, as depicted by corresponding solid-line path segments.

As depicted in FIG. 5 (and subsequent FIGS. 7, 9, and 10), a packet may be "looped back" using the same link the packet is received on. To facilitate this function, ingress ports in the network elements (e.g., RBridges for TRILL and switches/routers for IP) have an associated loopback buffer to re-inject traffic backward toward the source from the ingress direction. In one embodiment, all ingress ports are configured with loopback buffers, while in other embodiments, one or more ingress ports are configured with loopback buffers.

Figure 6:
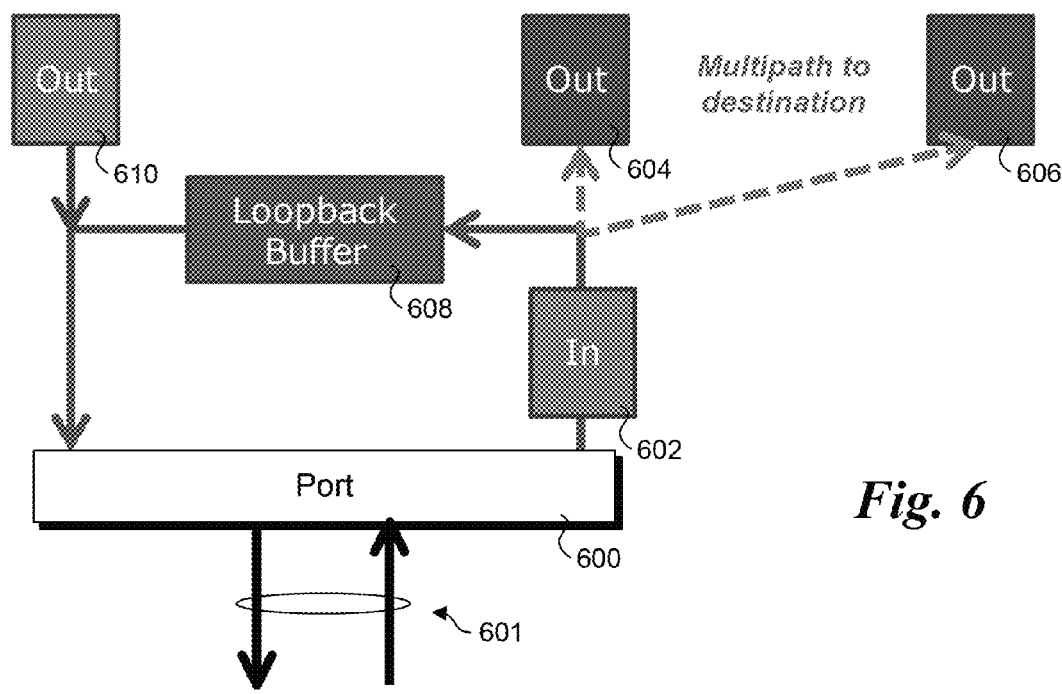
FIG. 6 is a block diagram illustrating usage of a loopback buffer, according to one embodiment.

An exemplary loopback buffer configuration is shown in FIG. 6. Under this configuration, a packet is received at a bidirectional (i.e., ingress (inbound) and egress (outbound)) port 600 via a link 601 and is initially buffered in an input buffer 602 to enable inspection of the packet header for forwarding purposes. Under an uncongested condition, the packet may be forwarded via ports connected to output buffers 604 and 606 (ports not shown). However, under some congested conditions (as discussed in detail with reference to the flowchart of FIG. 8 below), the packet may be looped back and routed "backwards" toward the source node from which the packet entered the network using the same link via which it was received (albeit in the opposite direction). In this situation, the packet is buffered in a loopback buffer 608 until it can be sent out of port 600. Under conventional usage, packets that are forwarded out of port 600 would be received at another port (not shown) and buffered in output buffer 606. Accordingly, a mechanism is implemented to multiplex packets from loopback buffer 608 and output buffer 610 so they can be transmitted out port 600. In one embodiment, loopback traffic is strictly prioritized over other traffic, such that any packets that are buffered to loopback buffer 608 are sent out prior to any packets that are buffered in output buffer 610.

Figure 7:
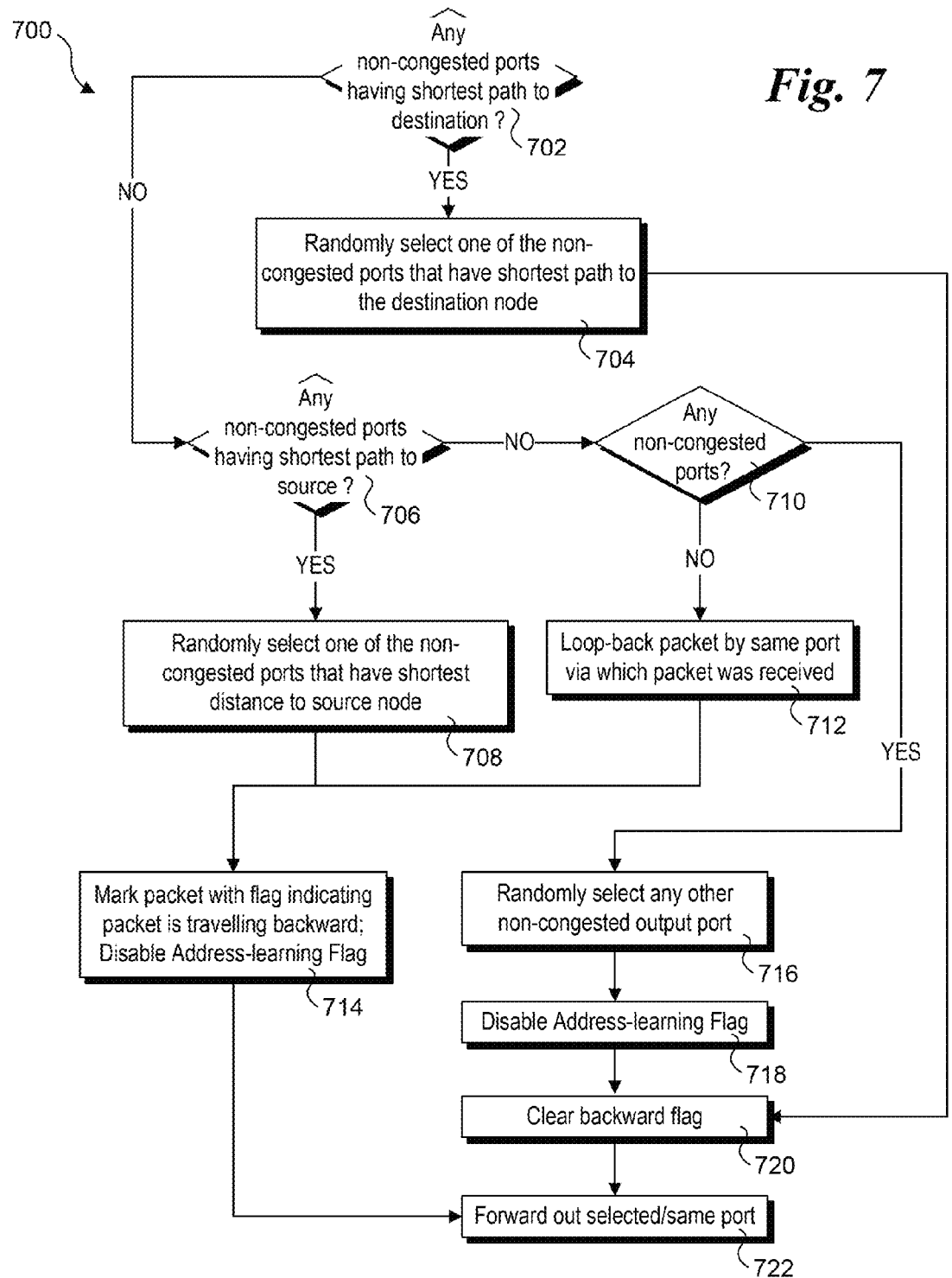
FIG. 7 is a flowchart illustrating operations logic performed by network elements to facilitate packet recirculation, according to one embodiment.

FIG. 7 shows a flowchart 700 illustrating operations and logic performed by RBridges to facilitate packet forwarding and re-circulation, according to one embodiment. Prior to the operations shown (and, generally, on an ongoing basis), each RBridge will exchange link-state packets with its neighbor nodes, and store (and update, as applicable) corresponding forwarding information in its LSP database. This will include identification of the ports use to forward packets via the shortest paths to various destination nodes. For simplicity, in the examples shown herein there is only a single destination node; however, it will be understood that similar forwarding information will be implemented for multiple destination nodes.

Preferably, packets will be forwarded using a shortest path via which the destination node may be reached. Under the multi-path forwarding facilitated by TRILL network, there may be multiple shortest paths from a given RBridge to a destination node. Generally, a shortest path may correspond to either a least-cost path (corresponding to a path with the lowest latency) or a path with the least number of hops (which under some conditions may be the same path). As used in flowchart 700, each of multiple paths having similar costs and/or hops to a destination node may be considered a shortest path. Other criteria may also be used to define a shortest path, including but not limited to link speed, congestion state of links, path costs for different classification and/or QoS, etc.

In view of the preference for forwarding via a shorted path, the first operation in flowchart 700 is performed by a decision block 702 in which a determination is made to whether there are any non-congested ports having a shortest path to the destination node. If the answer is YES and there are multiple non-congested ports that have the shortest path to the destination node, one of these ports is randomly selected, as shown in a block 704. If there is only a single non-congested port meeting the shortest path criteria, then it is selected in block 704 (logic not shown).

If there are no non-congested ports having a shorted path to the destination, the answer to decision block 702 is NO, and the logic proceeds to a decision block 706 in which a determination is made to whether there are any non-congested ports having a shorted path to the source node. If the answer is YES, the logic proceeds to a block 708 in which either a single port meeting the criteria is selected or one of multiple ports meeting the criteria is randomly selected.

If the answer to decision block 706 is NO, the logic proceeds to a decision block 710 in which a determination is made to whether any of the remaining ports are not congested. If the answer is YES, one of the non-congested ports is randomly selected (or the only non-congested port is selected) in a block 716.

Returning to decision block 710, if there are no non-congested ports, the packet is looped back using the same port via which the packet was received, as shown in a block 712. This is facilitated by the loop-back provision discussed above and shown in FIG. 6.

Packets that are to be forwarded back toward the source node (either via selection of a non-congested port or the use of the loop-back facility) are marked using a flag to indicate the packet is traveling backward, as shown in a block 714. For packets that are being forwarded toward the destination (either via a non-congested shorted path port or through selection of one of the remaining non-congested ports), the backward flag is cleared in a block 720. Also, for all packets except those that are forwarded via a shortest path route to the destination node, an address-learning flag is disabled, as shown in each of blocks 714 and 718. The processing operations and logic implemented by flowchart 700 are completed in a block 722 by forwarding the packet via the selected port or the same port (if loop-back applies).

In consideration of the logic implemented in flowchart 700, an output port is (generally) considered to be congested if one of follow conditions applies:

1. No free space is left in the output buffer (associated with the output port) to store the packet
2. If the last packet received from the corresponding input port within a configurable amount of time was marked as a backward packet.

In some cases the switches/NIC use a shared memory buffer with a shared pool area used by all with shared thresholds; in case a shared pool is full all the associated output ports are considered to be congested. In the case of only a single port there may be circumstances where traffic will be sent even if condition 2 is met. Also, with respect to condition 2, under one embodiment a timer is implemented at each output port of a node, wherein the timer is preferably set to the time it would take for a packet to travel back and forth to any next hop of the node.

Figure 8:
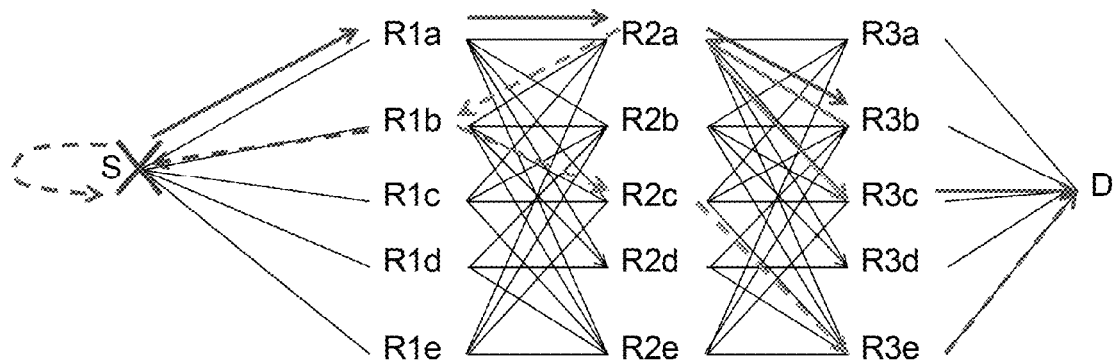
FIG. 8 is a diagram illustrating an example of a packet being forwarded back to a source node.

FIG. 8 depicts a condition under which a packet is routed backward until it is returned to source node S. In one embodiment, once a backward packet reaches its own source node, one of the following two handling options are implemented:
1. The packet is resent to the network according to the selection criteria presented in flowchart 700 and described above. In addition, the local operating system (OS) is notified to reduce the transmission rate of the specific flow.
2. The packet is dropped and a request to retransmit the packet is internally forwarded to the local OS, which, in return, will reduce the transmission rate of the specific flow.

It is noted that if the OS does not receive a request to reduce the transmission rate for a specific flow for a while, the OS may increase the transmission rate for the flow using one or more well-known rate decrease/increase algorithms (e.g., similar to those defined in QCN may be used); details of the algorithms are outside the scope of the present disclosure but may generally be known to those skilled in the networking arts.

Once a backward packet reaches another source node of the cloud, the packet is resent to the network according to the port selection criteria described above with reference to flowchart 700.

It is assumed that each packet (being forwarded via the techniques described herein) includes a hop count field that is decremented on every hop. In one embodiment, when the hop count reaches zero, the packet is dropped and a request to retransmit the packet is sent to the source node—preferably over another traffic class dedicated to congestion management for which flow control is used. This approach is employed to guarantee that a packet will not be recirculated back and forth over the same link for too long when all other ports of the switch are congested for a long period of time.

Under congestion conditions, non-reliable traffic and non-unicast traffic (i.e., packets that are forwarded to more than a single port), is either dropped or forwarded over another traffic class for which flow control is used. In one embodiment, the same is done for traffic that is generated from nodes inside the network cloud (i.e., network nodes that are not edge nodes). In one embodiment, these types of packets can be a priori marked by a dedicated flag. This technique for handling non-unicast traffic guarantees that the traffic for which the foregoing algorithm is run comprises conservative traffic that does not overload the cloud—assuming traffic injection is stopped or reduced whenever the cloud is out of resources.

The re-circulation technique overcomes transient congestions in networks without dropping packets, thus avoiding end-to-end latency increase associated with packet retransmissions triggered by timer expiration. Since the congestion notifications issued back to source nodes are triggered by congested packets being progressively returned up to the source node or by retransmission requests due to hop counts that finally reaches zero, the approach does not employ an a priori attempt to establish a control loop over the network, but rather is only effected when the flows/congestions have been proven to be long-lived. This results in improving the overall network throughput and efficiency.

Figure 9:
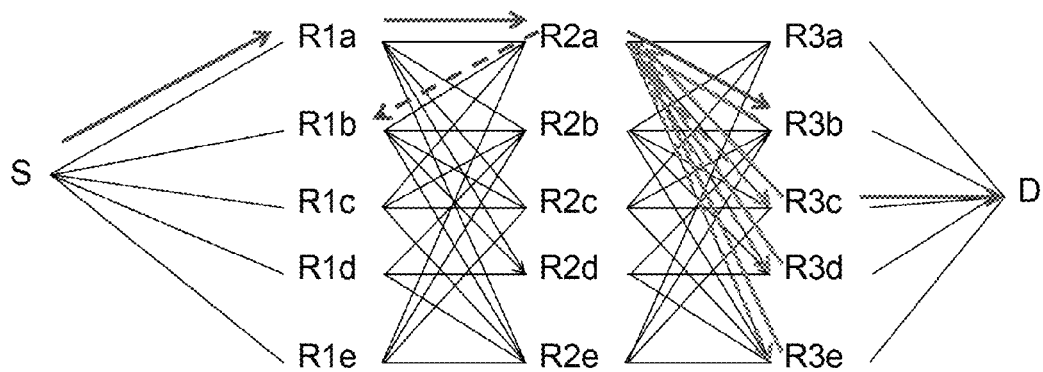
FIG. 9 is a diagram illustrating an approach for addressing a first type of deadlock, according to one embodiment.

Recirculation of packets may lead to potential deadlocks. Accordingly, under some embodiments measures are taken to address such deadlocks. For example, FIG. 9 shows a first potential deadlock under which a packet is routed many times back and forth between the same multipath links toward a destination (e.g., routed back and forth between R2a and one or more of R3b, R3c, R3d, and R3e). In one embodiment this is addressed by prioritizing routing a packet backward to the source when ALL the paths to destination are suspected to be blocked. A path is suspected to be blocked when the last packet received from the path is a looped back packet.

Figure 10:
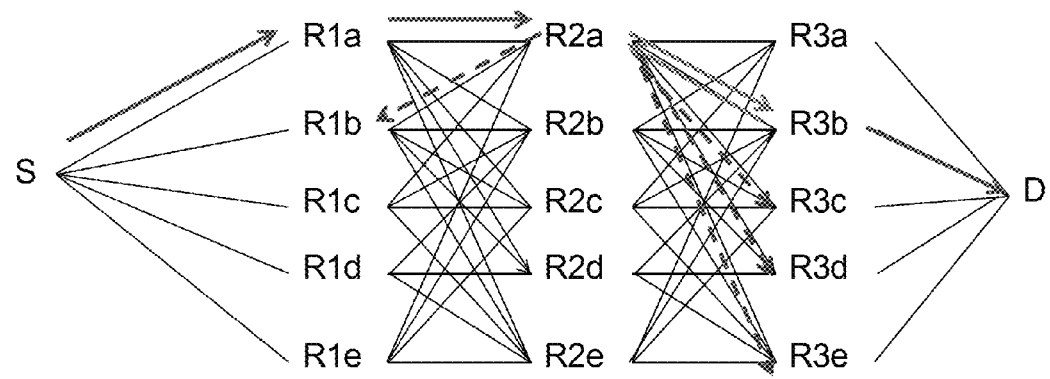
FIG. 10 is a diagram illustrating an approach for addressing a second type of deadlock, according to one embodiment.

FIG. 10 depicts a second potential deadlock under which a packet is routed many times back and forth around the same link because the link backward to the source is also blocked. Since there is no back-pressure from the end-nodes toward the network, this deadlock will terminate when the congested traffic to the destination/source is sunk or when the hops count reaches zero.

Packet Recirculation in IP Networks

In addition to Layer 2 Networks (e.g., Ethernet), packet recirculation may also be implemented in Layer 3 networks such as IP networks. However, rather than using RBridges, a Layer 3 network that implements packet recirculation will do so using modified switching elements (e.g., a network element comprising a switch or router) referred to herein as multi-path switches. Among the differences between a multi-path switch and a conventional Layer 3 switch or router is that multi-path switches are configured to forward packets destined for the same destination node via multiple different paths.

As before, a Layer 3 implementation has the following assumptions. 1) network cloud is provisioned with nodes that support multi-path forwarding between source and the destination nodes; 2) packets transported over a reliable transport protocol can arrive at the destination nodes out of order, without involving significant extra processing latency for delivering them to the application layer; and 3) congesting conditions are generally not long-lived enough relative to the round trip time from the hot spot (e.g., congested port) back to the source node in order to permit efficient network-wide congestion management control loops.

Figure 11:
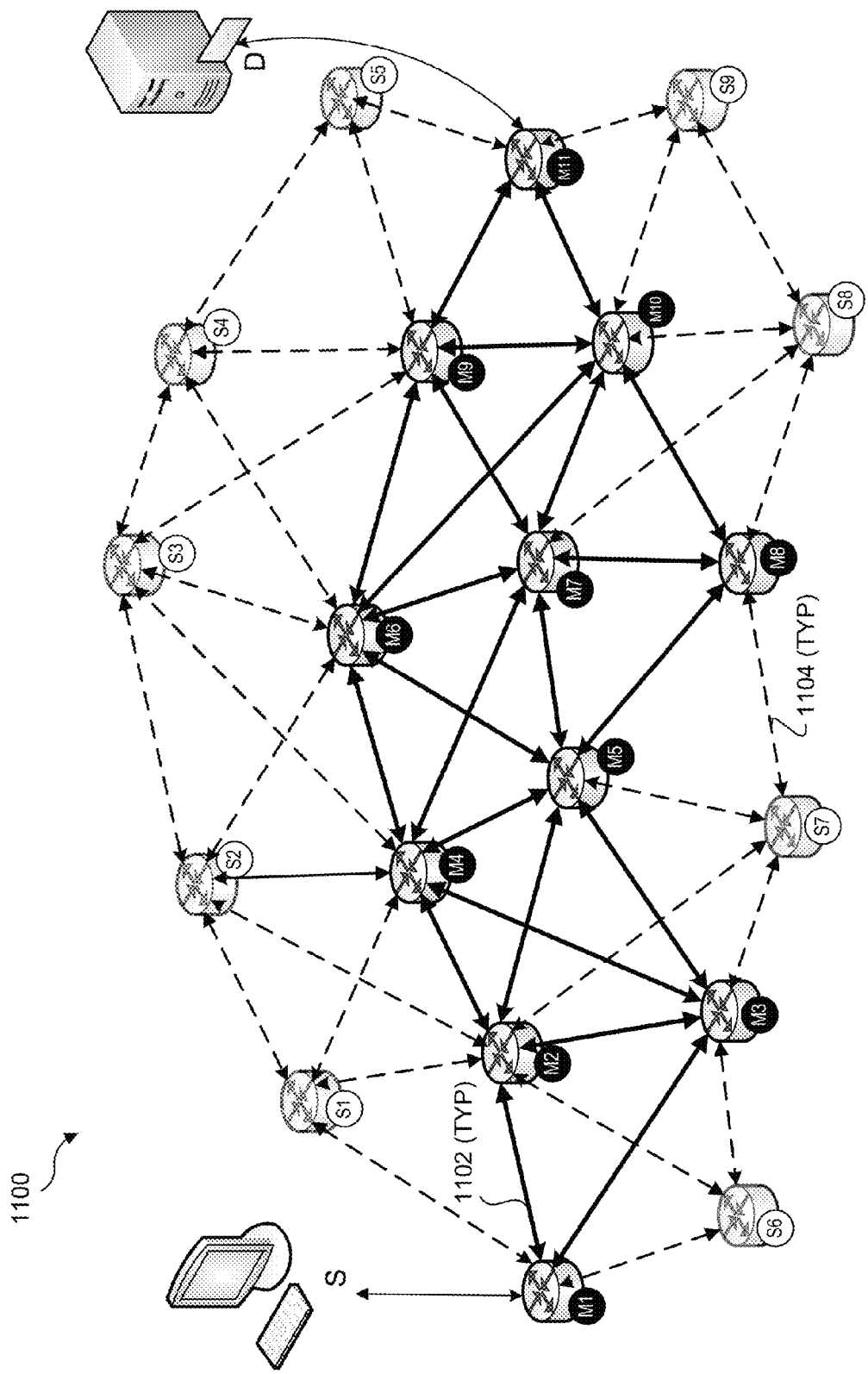
FIG. 11 is a schematic diagram of a Layer 3 network including multi-path switches configured to support packet recirculation.

In a manner similar to an Ethernet network employing a combination of RBridges and conventional bridges, a Layer 3 network employing packet recirculation may be implemented using a combination of multi-path switches and conventional switches. For example, a network 1100 having a mixture of conventional switches and multi-path switches is shown in FIG. 11. In network 1100, the conventional switches are labeled Si, where i=1-9, while the multi-path switches are labeled Mj, where j=1-11. The multi-path switches M1-11 are interconnected via multi-path links 1102 shown in bold solid lines. Meanwhile, any link 1104 that is coupled to a conventional switch S1-9 at at least one end of the link is shown as a dashed line.

Physically, multi-path links 1102 and links 1104 comprise conventional network links. However, multi-path links 1102 are distinguished from links 1104 to identify these links comprise path segments that may be implemented for multi-path forwarding and packet recirculation. While links 1104 may also be used as part of a multi-path forwarding path segment, the conventional switches connected to these links are not provisioned with logic and loopback buffers to support packet recirculation operations in accordance with the teachings herein. Conversely, each of multi-path links 1102 is connected to a multi-path switch at both ends that is configured to support packet recirculation.

As discussed above, under conventional IP routing/forwarding packets that are classified to the same flow are forwarded along the same route. This approach is converse to multi-path IP forwarding, where packets having a common destination may be forwarded along different route paths to the destination. Also, as discussed above, since this means some packets will have greater transport latencies than others, support for out-of-order packets for reliable transport protocols is necessitated. For example, a destination node or host employing a TCP/IP connection would be configured to not send SACKs (Selective ACKnowledgements) when it receives packets associated with the connection out of order, as would be done under standard TCP/IP practice.

As with RBridges in Layer 2 networks, the multi-path switches in a Layer 3 network would be configured with logic (e.g., via software executed by one or more processors or processor cores, via embedded logic, or that combination of the two) and loopback buffers for facilitating the packet recirculation operations disclosed herein. In addition, the Layer 3 switches would be configured to support conventional Layer 3 switch operations, thus facilitating forwarding of conventional Layer 3 traffic in the conventional manner.

As with RBridges, Layer 3 multi-path switches are configured to obtain network topology information and build forwarding table entries (e.g., filters and/or rules) to facilitate multi-path forwarding. In one embodiment, this may be facilitated using conventional Layer 3 network topology discovery techniques in combination with use of the OSPF protocol or other protocol used to discover the shortest paths between network nodes. As discussed above with Layer 2 networks, there may be multiple shortest paths between a given pair of network nodes, recognizing that the effective "lengths" of these paths need not be identical to categorize multiple of them as being the shortest path. Under a simple length determination, the length is equated to the number of hops between nodes, with no consideration to the latencies through the network elements at the ends of each hop. Under another approach, link costs are determined on an ongoing basis and corresponding link cost information is disseminated to the multi-path switches (such as using a link-state protocol), enabling cost to be assigned to each of multiple routes. Accordingly, route paths with the least cost are considered the shortest paths, again recognizing that route paths with least costs having similar values may be categorized as shortest paths.

Exemplary Apparatus for Implementing Packet Recirculation

Depending on the particularly implementation, aspects of the embodiments disclosed herein may generally be facilitated via either standalone or grouped network elements, or they may be implemented as embedded apparatus within another apparatus, such as a computer server. In some embodiments, an apparatus such as a server module, server blade, or line card may be configured with components and logic for facilitating the RBridge or Layer 3 network elements disclosed in the text and drawings herein.

Figure 12:
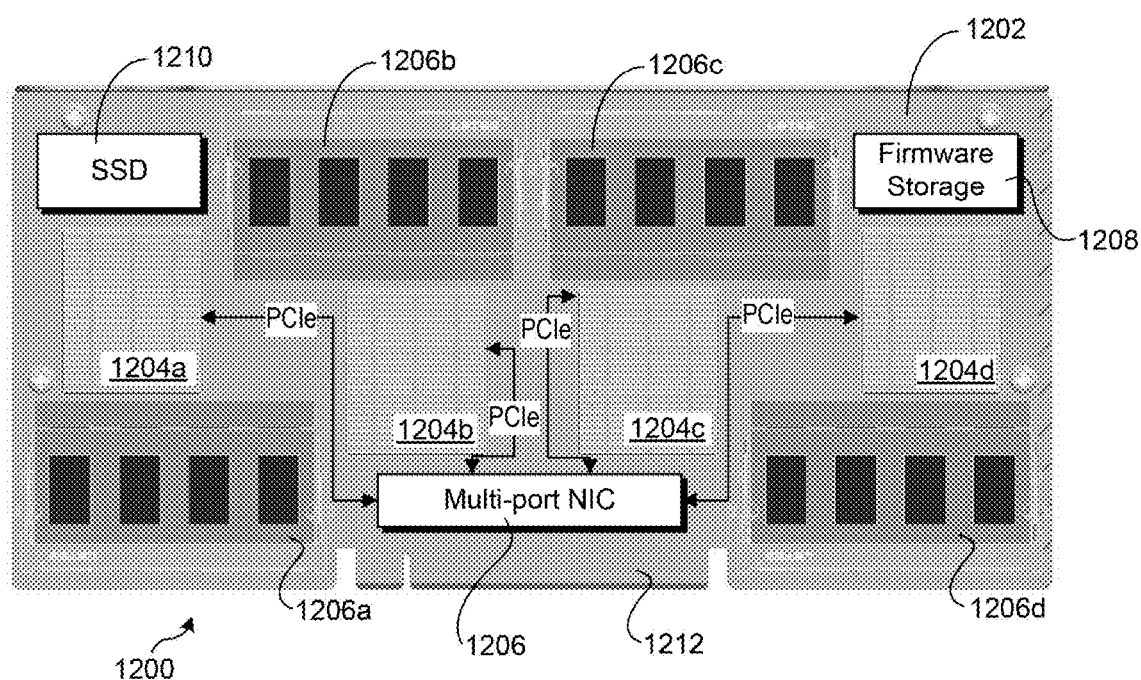
FIG. 12 is a schematic diagram illustrating an exemplary apparatus configured to support packet recirculation operation, according to one embodiment

FIG. 12 shows an exemplary single board apparatus 1200 that may be implemented in one or more of a standalone device, a server module, server blade, or line card. Apparatus 1200 includes a main board 1202 on which multiple components are installed or operatively coupled to via associated sockets or connectors, including four processors 1204*a-d*, each logically associated with respective memory modules 1206*a-d*. Also depicted is a multi-port Network Interface Controller (NIC) 1206, firmware storage 1208, and a solid state drive 1210. In the illustrated embodiment, processors 1204*a-d* are connected to multi-port NIC 1206 via respective PCIe (Peripheral Component Interconnect Express) interconnect, although this is merely exemplary of one type of interconnect between a processor and a NIC.

The number of processors and memory modules for apparatus 1200 are exemplary. Generally, apparatus 1200 may employ one or more processors and memory modules. The processors 1200*a-d* may comprise single-core or multi-core processors, and memory modules 1206*a-d* may comprise one or more memory components that may be packaged so be received by a corresponding connector/socket, or be coupled directly to main board 1202. In one embodiment, apparatus 1200 is illustrative of a server blade or line card. In another embodiment, apparatus 1200 may be implemented as the main board in a standalone Rbridge apparatus.

Multi-port NIC 1206 is configured with physical interfaces and memory buffers to support network interface to multiple network links (which may comprise wired, optical, or wireless links). For links employing physical cables (wired or optical), the connectors may be located on main board 1202 (connectors not shown) or the signals from the connectors may be coupled to multi-port NIC 1206 via a connector or the like, such as a edge connector 1212 depicted in FIG. 12. Multi-port NIC 1212 may also be configured to interface with one or more of processors 1204*a-d* to employ memory address spaces in one or more of memory modules 1206*a-d* to serve as output buffers. In one embodiment, such memory address spaces maybe accessed by Multi-port NIC 1206 using Direct Memory Address (DMA) transactions.

Figure 13A:
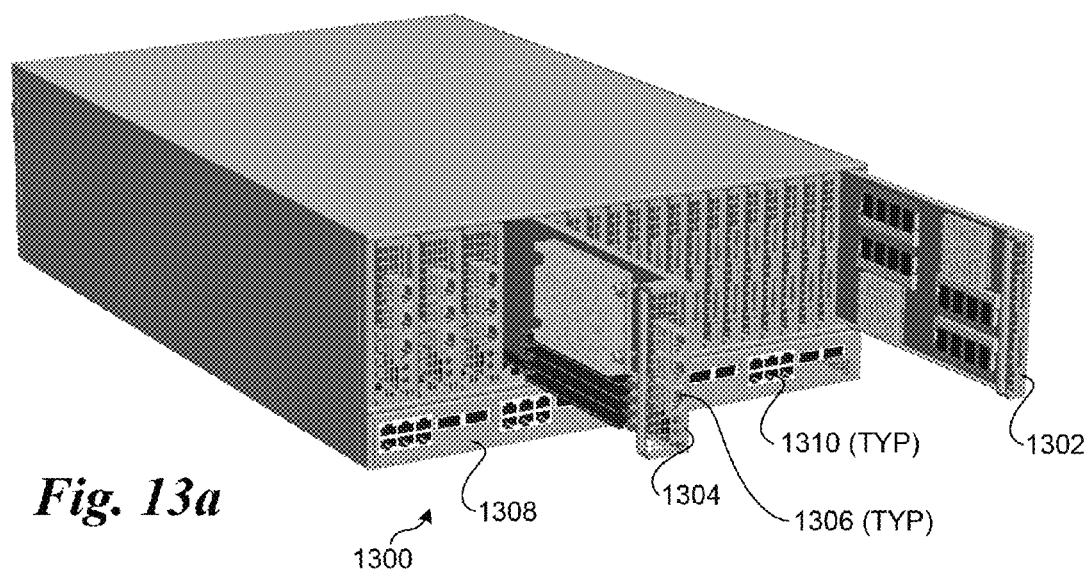
FIGS. 13a and 13b illustrate exemplary server blade chassis and server blade configurations that may be employed to implement aspects of the embodiments disclosed herein.
Figure 13B:
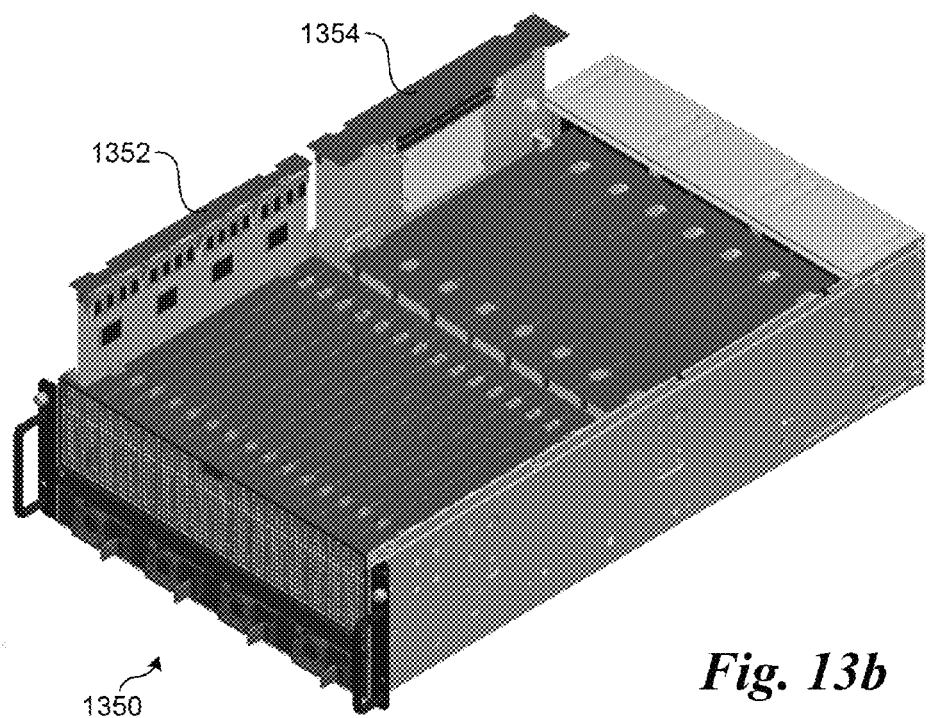

Aspects of the embodiments described herein may be implemented to facilitate networks comprising clustered server systems within rack-mountable chassis. For example, two exemplary configurations are illustrated in FIGS. 13*a* and 13*b*. In further detail, FIG. 13*a* depicts a 4U server blade chassis 1300 configured to employ a plurality server blades 1302 and network modules 1304. When installed in their respective slots, blades 1302 and modules 1304 are connected to a mid-plane that is located approximately mid-depth in chassis 1300 (not shown). The mid-plane includes wiring, circuitry, and connectors for facilitating communication between components on the blade main boards. In one embodiment, blades 1302 are similar to apparatus 1200, but employ a rear connector and are configured to be installed horizontally as opposed to being installed vertically from the top. In one embodiment, the slot width for module 1304 is twice the slot width used for blade 1302. In addition to the illustrated blades, other type of modules and devices may be installed in chassis 1300, such as Ethernet switch modules and hot-swap storage devices (the latter of which are installed from the opposite side of chassis 1300 depicted in FIG. 13*a*). In one embodiment, network modules 1304 include a plurality of Ethernet connectors 1306. Also as shown, server blade chassis 1300 includes a base module 1308 including a plurality of Ethernet connectors 1310.

FIG. 13*b* shows a 4U chassis 1350 in which blades 1352 and server modules 1354 are installed from the top, whereby the modules' PCB edge connectors are installed in corresponding slots in a baseboard disposed at the bottom of the chassis (not shown). Generally, the baseboard for chassis 1350 performs a similar function to the mid-plane in chassis 1300. In addition, the server configuration shown in FIG. 13*b* may further employ a mezzanine board (also not shown) that is configured to facilitate additional communication functions. In the embodiment illustrated in FIG. 13b, the slot width for server modules 1354 is twice the slot width for blades 1352. Chassis 1350 also is configured to house other types of modules and devices, such as Ethernet switch modules and hot-swap storage devices.

Some embodiments of Layer 3 network elements may be configured in a similar manner to the configurations shown in FIGS. 13a and 13b (i.e., multiple boards or modules mounted within a chassis), but typically employ "line cards" as opposed to server blades. In some embodiments, the line cards may have a standard configuration, such as defined for Advanced Telecommunication Computing Architecture (ATCA) boards and chassis. For example, typical ATCA chassis are 12U or 13U high and supports installation of 14 boards. Other configurations of Layer 3 switches or routers may also be implemented, including single board configurations.

In a data center or similar implementations, individual network subnets or Ethernet segments may comprise a plurality of blade servers linked in communication at various grouping levels, such as multiple blade server chassis within a rack or a section of a rack of servers within the data center comprising a subnet or Ethernet segment. Under this type of installation, a portion of the blades may be implemented as Rbridges or Layer 3 switches that support packet recirculation in accordance with aspects of the embodiments disclosed herein, while other blades are used primarily for processing purposes and are configured as network endpoints.

FIG. 14 shows a NIC 1400 configured to implement packet recirculation in accordance with aspects of the embodiments disclosed herein. NIC 1400 is configured to support n ports, as depicted by ports 600a, 600b, . . . 600n, wherein each of ports 600 is coupled to a respective link cable 601. A set of buffers and physical layer (PHY) interfaces are provided for each port, as depicted by PHY interfaces 1404, input buffers 1406 and output buffers 1408. In the illustrated embodiment, each set of buffers further includes a loopback buffer 1410. In one embodiment, a loopback buffer will be provided for each ingress port on the NIC. In other embodiments, the NIC will include one or more loopback buffers.

NIC 1400 includes a packet processing logic block 1412, which is configured to implement packet processing operations in accordance with aspects of the embodiments disclosed herein, including operation relating to packet recirculation. Exemplary components for implementing such packet processing logic include a network processing unit (NPU) 1414, an instruction store 1416, and memory 1418. NIC 1400 also includes an interconnect interface 1420 for supporting communication between NIC 1400 and its system host hardware (e.g., a server platform board). In one embodiment interconnect interface comprises a PCIe interface.

NIC 1400 is depicted as belonging to the Hardware (HW) portion of the drawing figure, while Software (SW)-related components are depicted above the HW/SW line. These include software components that are typically implemented by an operating system of a platform configured interface with a NIC, as depicted by a NIC device driver 1422 and software packet processing logic 1424 that includes instructions and data that are stored in system memory 1426 (i.e., system memory for the host platform).

NIC 1400 is configured to support packet forwarding operations, some of which may be implemented entirely via the NIC, while other operations are performed by interaction with software packet processing logic 1424. For example, forwarding table data, such as forwarding filters and rules may typically be generated in connection with packet classification operations relating to new flows, wherein new filters and/or rules are generated by software packet processing logic 1424. All or a portion of the filters and/or rules may be copied to a forwarding table 1428 in memory 1412. In addition, port status information 1430 is maintained in memory 1412, enabling packet processing logic employed by NIC 1400 to ascertain the current status (e.g., congested or non-congested of each of the output ports coupled to the NIC. In addition, on platforms that employ multiple NICs, the port status information 1430 may include the current status of ports coupled to other NICs.

NIC 1400 is configured to support both conventional packet forwarding and packet recirculation operations. In connection with conventional packet forwarding, packet data in the form of an electrical analog, optical, or wireless signal are received at an ingress port PHY, converted to a digital form and deserialized, with corresponding packet data initially buffered in an input buffer 1406. The header of the packet is then examined by packet processing logic block 1412 using packet classification logic (not shown). Once classified, a lookup of forwarding table 1428 is performed to determine which port to forward the packet out of. The packet data is then copied from input buffer 1406 to an output queue 1432 in system memory 1426 associated with the output port that is to be employed. As an optional approach, packet data an input buffer 1406 may be copied to system memory and classified using software packet processing logic 1424. The packets in an output queue 1432 are copied to output buffers 1408 when buffer space is available, typically using a FIFO (First In, First Out) buffer technique. The packets are then forwarded from an output buffer 1408 by serializing a digital stream, converting the digitized stream into an electrical analog, optical, or wireless signal via PHY 1404, and sent outbound over the link to the next network element coupled at the opposing end of the link. All of the foregoing are conventional packet forwarding operations, in terms of handling and forwarding received packets using conventional forwarding tables.

As discussed above, the network elements may be configured to support multi-path forwarding. Accordingly, forwarding table 1428 may include forwarding filters and rules supporting multiple paths, such that a packet classified to the same flow may be forwarded via different ports in accordance with the teachings disclosed above. To facilitate this, the operations and logic of flowchart 700 are implemented by packet processing logic 1412. In addition, NIC 1400 and/or a software entity is configured to determine multi-path routes between sources and destination using the techniques described above.

In addition to supporting multi-path forwarding, NIC 1400 is also configured to support loopback operations in accordance with the techniques described above. In one embodiment, this is facilitated in the following manner. Upon performing packet classification, packet processing logic 1412 checks the status of the various output ports via a lookup to port status information 1430. The packet processing logic determines, based on the port status information, the packet is to be looped back via the same link it was received on. Accordingly, the packet data is copied from input buffer 1406 to loopback buffer 1410. As described above, loopback buffers are coupled to the output of the port, and thus packets that are buffered in a loopback buffer are sent back out the same port they are received on.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a server or firmware executed by an embedded processor on a network element. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented by a network element in a network supporting multi-path forwarding, the network element comprising a node in the network and having a plurality of ports connected via respective links to other nodes in the network, the method comprising:
    receiving a first packet at a first port, the first packet including address information identifying a source node from which the first packet originated and a destination node to which the first packet is to be delivered;
    determining that each of multiple ports via which the first packet may be sent along a path from the network element toward the destination node are congested; and, in response thereto;
    selecting a port to cause the first packet to travel backward toward the source node; and
    forwarding the first packet out of the selected port.

2. The method of claim 1, wherein the network comprises a TRILL (Transparent Interconnection of Lots of Links) network, and the network element comprises an RBridge.

3. The method of claim 1, wherein the network comprises a Layer 3 network, and the network element comprises one of a switch or router.

4. The method of claim 1, wherein there are multiple shortest path routes from the network element to the destination node that may be accessed from at least two different ports, and wherein determining that each of multiple ports via which the first packet may be sent along a path from the network element toward the destination node are congested comprises determining that all ports via which a shortest path route may be accessed are congested.

5. The method of claim 4, wherein determining that each of multiple ports via which the first packet may be sent along a path from the network element toward the destination node are congested further comprises determining that all ports via which the first packet may be forwarded toward the destination node are congested.

6. The method of claim 1, wherein the first port and the selected port are the same port, resulting in the first packet being looped back along the same link via which it was received.

7. The method of claim 6, further comprising buffering the first packet in a loopback buffer associated with the first port.

8. The method of claim 1, further comprising:
   determining there are multiple ports on the network element via which shortest paths from the network element to the source node may be accessed; and
   randomly selecting the port via which the first packet is sent out toward the source node from among the multiple ports via which shortest paths may be accessed.

9. The method of claim 1, further comprising marking the first packet to indicate the first packet is travelling backward.

10. The method of claim 1, further comprising disabling an address-learning indicator for the first packet.

11. The method of claim 1, further comprising:
    receiving a second packet at the first port of the network element, the second packet including address information identifying a source node from which the second packet originated and a destination node to which the first packet is to be delivered;
    identifying each of a plurality of non-congested ports via which the second packet may be forwarded toward the destination node along a shortest path from the network element to the destination node; and
    forwarding the second packet out of one of the plurality of non-congested ports that is identified.

12. The method of claim 1, further comprising:
    discovering a network topology of the network relative to the network element;
    employing the network topology to identify a first plurality of shortest paths to the destination node; and
    employing the network topology to identify a second plurality of shortest paths to the source node.

13. The method of claim 12, wherein discovery of the network topology is facilitate via use of a link-state protocol under which link state information is exchanged between the network element and each of a plurality of neighbor nodes coupled to the network element via respective links.

14. The method of claim 1, further comprising;
    receiving a second packet at a second port of the network element, the second packet including address information identifying a source node from which the second packet originated and a destination node to which the second packet is to be delivered;
    inspecting the packet and determining it is marked with indicia indicating it is traveling backward;
    identifying one or more non-congested ports via which the second packet may be forwarded toward the destination node;
    removing the indicia indicating the packet is traveling backward; and
    forwarding the second packet out of one of the plurality of non-congested ports that is identified.

15. The method of claim 14, wherein the second port second packet is forwarded out of the second port.

16. The method of claim 14, wherein the second port is one of the plurality of non-congested ports via which the second packet may be forwarded to the destination node, and wherein the second packet is forwarded out of a non-congested port from among the plurality of non-congested ports that is not the second port.

17. A network element, comprising:
    a plurality of ports;
    a plurality of buffers, operatively coupled to the plurality of input and output ports, including at least one loopback buffer;
    wherein the network element is configured, when operated in a network supporting multi-path forwarding between a plurality of network nodes, to perform operations including,
    receiving a first packet at a first port, the first packet including address information identifying a source node from which the first packet originated and a destination node to which the first packet is to be delivered;
    determining that each of multiple ports via which the first packet may be sent along a path from the network element toward the destination node are congested; and, in response thereto;
    selecting a port to cause the first packet to travel backward toward the source node; and
    forwarding the first packet out of the selected port.

18. The network element of claim 17, wherein the network element is a Layer 2 bridge.

19. The network element of claim 18, wherein the network comprises a TRILL (Transparent Interconnection of Lots of Links) network, and the network element comprises an RBridge.

20. The network element of claim 17, wherein the network element comprises one of a Layer 3 switch or router.

21. The network element of claim 17, wherein the plurality of ports include a plurality of input ports, and wherein the network element further includes a respective loopback buffer operatively coupled to each of the plurality of input ports.

22. The network element of claim 17, wherein there are multiple shortest path routes from the network element to the destination node that may be accessed from at least two different ports, and wherein determining that each of multiple ports via which the first packet may be sent along a path from the network element toward the destination node are congested comprises determining that all ports via which a shortest path route may be accessed are congested.

23. The network element of claim 17, wherein the first port and the selected port are the same port, resulting in the first packet being looped back along the same link via which it was received, and wherein the network element is further configured to buffer the first packet in a loopback buffer for the first port.

24. The network element of claim 17, wherein the network element is further configured to perform operations comprising:
    receiving a second packet at a second port of the network element, the second packet including address information identifying a source node from which the second packet originated and a destination node to which the second packet is to be delivered;
    inspecting the packet and determining it is marked with indicia indicating it is traveling backward;
    identifying one or more non-congested ports via which the second packet may be forwarded toward the destination node;
    removing the indicia indicating the packet is traveling backward; and
    forwarding the second packet out of one of the plurality of non-congested ports that is identified.

25. The network element of claim 17, wherein the network element is further configured to perform operations comprising:
- discovering a network topology of the network relative to the network element;
- employing the network topology to identify a first plurality of shortest paths to the destination node; and
- employing the network topology to identify a second plurality of shortest paths to the source node.

26. A network interface controller (NIC), comprising:
- a plurality of port interfaces, each associated with a network port and including an input buffer, an output buffer, and a loopback buffer; and
- packet processing logic configured to perform packet processing operations when the NIC is installed and operated in a NIC host device and the plurality of ports are coupled to respective links in a network supporting multi-path forwarding between a plurality of network nodes including the NIC host device, the operations including,
  - receiving a packet at a first port interface, the packet including address information identifying a source node from which the packet originated and a destination node to which the packet is to be delivered;
  - performing packet processing on the packet and determining, in view of port congestions, that the packet is to be routed backward toward the source node;
  - selecting a port to cause the packet to routed backward toward the source node; and
  - forwarding the packet out of the port interface associated with the port that is selected.

27. The NIC of claim 26, wherein the packet processing logic is configured to perform further operations comprising:
- selecting the first port to cause the first packet to travel backward toward the source node; and
- buffering the packet in a loopback buffer associated with the first port interface; and
- forwarding the packet out of the first port interface.

28. The NIC of claim 26, wherein network comprises a TRILL (Transparent Interconnection of Lots of Links) network, and the NIC host device is configured to be operated as an RBridge.

29. The NIC of claim 26, wherein the network comprises a Layer 3 network.

30. The NIC of claim 26, wherein there are multiple shortest path routes from the host platform to the destination node that may be accessed from at least two different ports, and wherein the packet processing logic is configured to perform further operations comprising:
- determining that each of the multiple ports via which the first packet may be sent along a shortest path from the NIC host device toward the destination node are congested; and, in response thereto; and
- selecting a non-congested port to forward the packet backward toward the source node.

* * * * *